US008879464B2

(12) United States Patent
Michaelis et al.

(10) Patent No.: US 8,879,464 B2
(45) Date of Patent: Nov. 4, 2014

(54) SYSTEM AND METHOD FOR PROVIDING A REPLACEMENT PACKET

(75) Inventors: Paul Roller Michaelis, Louisville, CO (US); Roger Toennis, Arvada, CO (US); Douglas M. Grover, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1035 days.

(21) Appl. No.: 12/361,950

(22) Filed: Jan. 29, 2009

(65) Prior Publication Data
US 2010/0188967 A1 Jul. 29, 2010

(51) Int. Cl.
*H04L 1/22* (2006.01)
*H04L 1/00* (2006.01)
*G06F 11/20* (2006.01)

(52) U.S. Cl.
CPC ........... *H04L 1/22* (2013.01); *H04L 2001/0097* (2013.01); *G06F 11/2007* (2013.01)
USPC ........................................................ 370/316

(58) Field of Classification Search
USPC ........................................................ 370/216
See application file for complete search history.

(56) References Cited

U.S. PATENT DOCUMENTS

| 5,537,447 A | 7/1996 | Urbansky |
| 5,619,514 A | 4/1997 | Smith |
| 5,745,425 A | 4/1998 | Anderson et al. |
| 5,859,882 A | 1/1999 | Urbansky |
| 5,920,507 A | 7/1999 | Takeuchi et al. |
| 6,141,788 A | 10/2000 | Rosenberg et al. |
| 6,170,075 B1 | 1/2001 | Schuster et al. |
| 6,243,836 B1 | 6/2001 | Whalen |
| 6,260,071 B1 | 7/2001 | Armistead et al. |
| 6,381,645 B1 | 4/2002 | Sassin |
| 6,434,590 B1 | 8/2002 | Blelloch et al. |

(Continued)

FOREIGN PATENT DOCUMENTS

| DE | 10211740 | 10/2003 |
| DE | 102006027708 | 2/2008 |

(Continued)

OTHER PUBLICATIONS

Calvin Azuri, VoIP Services for SMB & Residential, http://74.125.95.104/search?q=cache:JqCKutpPN7gJ: voipservices.tmcnet.com/feature/article, Nov. 16, 2007, USA.

(Continued)

*Primary Examiner* — Jason Mattis
*Assistant Examiner* — Stephen J Clawson
(74) *Attorney, Agent, or Firm* — Sheridan Ross P.C.

(57) ABSTRACT

The system generates a first data stream which represents a data signal. The first data stream is encoded via a first encoding technique. The first data stream comprises one or more packets with a duration and timestamp. The data signal is encoded into a second data stream using a different encoding technique with a corresponding packet in the second data stream. A packet in the second data stream has the same duration and timestamp as the corresponding packet in the first data stream.

The first data stream is sent on a first network. The second data stream is sent on a second network. The first and second data streams are received. A missing/delayed packet in the first data stream is detected. The data signal is regenerated using the first data stream and the packet from the second data stream that corresponds to the missing/delayed packet in the first data stream.

56 Claims, 8 Drawing Sheets

(56) References Cited

U.S. PATENT DOCUMENTS

| | | | |
|---|---|---|---|
| 6,434,606 B1 | 8/2002 | Borella et al. | |
| 6,452,950 B1 | 9/2002 | Ohlsson et al. | |
| 6,650,637 B1 | 11/2003 | Bansal et al. | |
| 6,690,675 B1 | 2/2004 | Kung et al. | |
| 6,763,226 B1 | 7/2004 | McZeal, Jr. | |
| 6,769,027 B1 | 7/2004 | Gebhardt et al. | |
| 6,823,047 B1 | 11/2004 | Cruickshank | |
| 6,845,129 B2 | 1/2005 | Golin | |
| 6,862,298 B1 | 3/2005 | Smith et al. | |
| 6,879,582 B1 | 4/2005 | Dhara et al. | |
| 6,914,899 B2 | 7/2005 | Siegrist et al. | |
| 6,914,964 B1 | 7/2005 | Levine | |
| 6,977,948 B1 | 12/2005 | Chennubhotla et al. | |
| 6,988,126 B2 | 1/2006 | Wilcock et al. | |
| 7,203,193 B2 | 4/2007 | Hoof | |
| 7,215,959 B2 | 5/2007 | Creamer et al. | |
| 7,293,176 B2 | 11/2007 | Otway et al. | |
| 7,352,766 B2 | 4/2008 | Van Asten et al. | |
| 7,385,985 B2 | 6/2008 | Narsinh et al. | |
| 7,386,115 B2 | 6/2008 | Peters | |
| 7,418,002 B2 | 8/2008 | Robotham et al. | |
| 7,477,653 B2 | 1/2009 | Smith et al. | |
| 7,496,750 B2 | 2/2009 | Kumar et al. | |
| 7,558,529 B2 | 7/2009 | Seshadri et al. | |
| 7,583,660 B2 | 9/2009 | Croak et al. | |
| 7,626,994 B2 | 12/2009 | Bennett | |
| 7,627,097 B2 | 12/2009 | Kawabata et al. | |
| 7,643,470 B2 | 1/2010 | Herledan et al. | |
| 7,702,947 B2 | 4/2010 | Peddada | |
| 7,742,916 B2 | 6/2010 | Barriac et al. | |
| 7,782,839 B2 | 8/2010 | Otsuka et al. | |
| 7,830,860 B2 | 11/2010 | Farris et al. | |
| 7,864,814 B2 | 1/2011 | Johansson et al. | |
| 7,881,284 B2 | 2/2011 | Lin et al. | |
| 2001/0028634 A1* | 10/2001 | Huang et al. | 370/252 |
| 2003/0163328 A1* | 8/2003 | Rambo et al. | 704/500 |
| 2004/0057445 A1 | 3/2004 | LeBlanc | |
| 2004/0076190 A1 | 4/2004 | Goel et al. | |
| 2004/0120309 A1 | 6/2004 | Kurittu et al. | |
| 2005/0094618 A1* | 5/2005 | Colban et al. | 370/350 |
| 2005/0249146 A1 | 11/2005 | Pinault et al. | |
| 2006/0007915 A1 | 1/2006 | Frame | |
| 2006/0062371 A1 | 3/2006 | Vanderheiden et al. | |
| 2006/0083199 A1 | 4/2006 | Yang | |
| 2006/0140221 A1 | 6/2006 | Yamada et al. | |
| 2006/0203805 A1 | 9/2006 | Karacali-Akyamac et al. | |
| 2006/0251051 A1 | 11/2006 | Bhatt et al. | |
| 2006/0256772 A1 | 11/2006 | Yarlagadda | |
| 2007/0026852 A1 | 2/2007 | Logan et al. | |
| 2007/0081460 A1 | 4/2007 | Karacali-Akyamac et al. | |
| 2007/0110034 A1 | 5/2007 | Bennett | |
| 2007/0147399 A1 | 6/2007 | Deng et al. | |
| 2007/0167156 A1* | 7/2007 | Hundal | 455/426.1 |
| 2007/0177579 A1 | 8/2007 | Diethorn et al. | |
| 2007/0183323 A1 | 8/2007 | Hannu et al. | |
| 2007/0223467 A1 | 9/2007 | Makiuchi et al. | |
| 2007/0237185 A1* | 10/2007 | Pereira et al. | 370/503 |
| 2007/0280428 A1 | 12/2007 | McClelland | |
| 2007/0291733 A1 | 12/2007 | Doran et al. | |
| 2008/0002689 A1 | 1/2008 | Vera | |
| 2008/0013528 A1* | 1/2008 | Miller et al. | 370/352 |
| 2008/0089289 A1* | 4/2008 | Jayaram et al. | 370/331 |
| 2008/0165708 A1 | 7/2008 | Moore et al. | |
| 2008/0187108 A1 | 8/2008 | Engelke et al. | |
| 2008/0205377 A1 | 8/2008 | Chao et al. | |
| 2008/0225850 A1* | 9/2008 | Oran et al. | 370/392 |
| 2008/0232353 A1 | 9/2008 | Vafin et al. | |
| 2008/0232442 A1 | 9/2008 | Rodbro et al. | |
| 2008/0240004 A1 | 10/2008 | Shaffer et al. | |
| 2008/0298336 A1* | 12/2008 | Gollamudi | 370/343 |
| 2008/0298349 A1 | 12/2008 | Beightol et al. | |
| 2008/0310398 A1 | 12/2008 | Jain et al. | |
| 2009/0074012 A1 | 3/2009 | Shaffer et al. | |
| 2009/0213837 A1 | 8/2009 | Ku et al. | |
| 2009/0234940 A1 | 9/2009 | Pal et al. | |
| 2009/0235329 A1 | 9/2009 | Chavez et al. | |
| 2010/0165857 A1 | 7/2010 | Meylan et al. | |
| 2010/0189097 A1 | 7/2010 | Weissmann et al. | |
| 2010/0208728 A1 | 8/2010 | Michaelis et al. | |
| 2010/0239077 A1 | 9/2010 | Michaelis et al. | |
| 2010/0265834 A1 | 10/2010 | Michaelis et al. | |
| 2010/0271944 A1 | 10/2010 | Michaelis et al. | |
| 2010/0322391 A1 | 12/2010 | Michaelis et al. | |

FOREIGN PATENT DOCUMENTS

| | | |
|---|---|---|
| EP | 0152251 | 8/1985 |
| EP | 1471708 | 10/2004 |
| EP | 1515506 | 3/2005 |
| EP | 1681844 | 7/2006 |
| EP | 1729490 | 12/2006 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

Wikipedia; Jitter—From Wikipedia, the free encyclopedia; printed from http://en.wikipedia.org/wiki/Jitter on Mar. 10, 2009; 6 pages.

Counterpath Corporation; "Network Convergence Gateway (NCG)", Internet Article printed on Nov. 25, 2008 from http://www.counterpath.com/network-convergence-gateway-ncg.html; 2 pages.

Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.

Webopedia; What is jitter buffer?—A Word Definition for the Webopedia Computer Dictionary; printed from http://www.webopedia.comITERM/J/jitter_buffer.html on Mar. 10, 2009; 6 pages.

Wikipedia; "Network switching subsystem"; Internet Article printed on Feb. 6, 2009 from http://en.wikipedia/org/wiki/Home_Location_Register; 10 pages.

Wikipedia; "Subscriber Identity Module"; Internet Article printed on Feb. 6, 2009 from http://en.wikipedia.org/wiki/Subscriber_Identity_Module; 8 pages.

Wikipedia "H.323", http://en.wikipedia.org/w/index.php?title=H.323&printable=yes, Dec. 18, 2008, 14 pages.

Wikipedia "RTP Control Protocol"; http://en.wikipedia.org/w/index.php?title=RTP_Control_Protocol< . . . Jan. 9, 2009, 3 pages.

Wikipedia "Voice over Internet Protocol"; http://en.wikipedia.org/wiki/Voice_over_Internet_Protocol Jan. 23, 2009, 15 pages.

Wikipedia "H.245"; http://en.wikipedia.org/wiki/H.245 Nov. 9, 2009, 1 page.

"Indepth: Jitter", VoIP Troubleshooter website, available at http://www.voiptroubleshooter.com/indepth/jittersources.html, accessed on Oct. 22, 2009, pp. 1-8.

Background of the Invention for the above captioned application filed Jan. 29, 2009 (previously provided).

* cited by examiner

SYSTEM AND METHOD FOR PROVIDING A REPLACEMENT PACKET

TECHNICAL FIELD

The system and method relates to redundant communications and in particular to redundant communications methods for providing a replacement packet.

BACKGROUND

Currently, there are a variety of systems that send redundant data streams over different networks in order to provide failover in case one of the networks fails. This way, if a network fails, the data stream will still be received and minimal disruption to the data stream will occur.

Other systems identify multiple routing paths for a data stream. When one routing path fails or drops below a certain quality of service, the data stream is then routed down a second path. For example, U.S. Patent Application Publication 2007/0177579 describes a system that evaluates the quality of service for a first network path. The system sends data on redundant data paths. If the quality of service of the first network path falls below a predefined level, the receipt of the data stream is switched from the first network path to the second network path. Likewise, Patent Application Publication 2006/0203805 describes a system that evaluates the quality of service of multiple network paths and then routes a data stream down the network path with the higher quality of service.

The problem with these approaches is that they are not optimized to address the deficiencies that are unique to sending audio streams over packet-based communication systems. The most common being impairment is due to intermittent packet loss and packet delay. In addition, these systems fail to utilize factors such different audio packet durations, packet timestamps, packet sequence numbers, multi-vendor encoding standards, and analysis of acoustic properties of audio packets.

SUMMARY

The system and method are directed to solving these and other problems and disadvantages of the prior art. In the defined system and method, a source node generates a first audio stream in which the media are encoded via an algorithm that optimizes perceived quality. (Commonly accepted measures of perceived quality include Mean Opinion Score and intelligibility.) In general, algorithms that provide high quality also require greater bandwidth, as measured in number of bits per second. In this context, it is important to note that the bandwidth requirements for high quality speech or video transmissions are well within the capabilities of most Voice over Internet Protocol networks, but exceed the amount permitted by typical cellular telephone connections.

The source node also creates a second audio stream in which the media are encoded using a second algorithm that typically optimizes bandwidth conservation. Note that the algorithms that optimize bandwidth conservation generally do not provide the same degree of perceived quality that is offered by the high bandwidth algorithms. (Illustratively, although the audio encoding algorithm described by ITU-T Standard G.711 has a noticeably higher Mean Opinion Score than ITU-T Standard G.729, it also requires approximately eight times as much bandwidth.)

The packets of the first audio stream and the corresponding packets of the second audio stream have the same duration. They also have the same timestamp. Typically, the only difference between the two audio streams is the encoding algorithm. The first audio stream contains packets in which the source media are encoded via an algorithm that typically optimizes perceived quality. The second audio stream contains packets in which the same source media are encoded via an algorithm that typically optimizes bandwidth conservation. This means that a packet with sequence number X and time stamp Y in the first stream, and a packet with sequence number X and time stamp Y in the second stream, would contain differently encoded versions of the same information.

In a preferred implementation of the invention, the higher-quality high-bandwidth packet stream is generated and transmitted by the source node to a destination node via a Voice over Internet Protocol (VoIP) network. Concurrently, the lower-quality low-bandwidth second audio stream is transmitted by the source node to the destination node via a second network, such as the cellular telephone network. (Low bandwidth techniques are proposed for the second stream for reasons of economy.) The destination node preferentially utilizes the higher-quality high-bandwidth packets that are received via the VoIP network.

In a second embodiment, instead sending an second packet for every packet in the first audio stream, the system and method utilize the techniques described in U.S. Pat. No. 7,359,979 that allow the relative importance of media packets to be assessed. By utilizing these encoding techniques the bandwidth requirements of the second network is reduced, thereby achieve greater economy.

Given that such an approach could be expected to reduce the bandwidth required for each conversation to a point well below what a cellular link is able to support, the system and method would achieve an even greater economy by multiplexing the high priority packets of more than one simultaneous audio conversations into a single cellular link.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
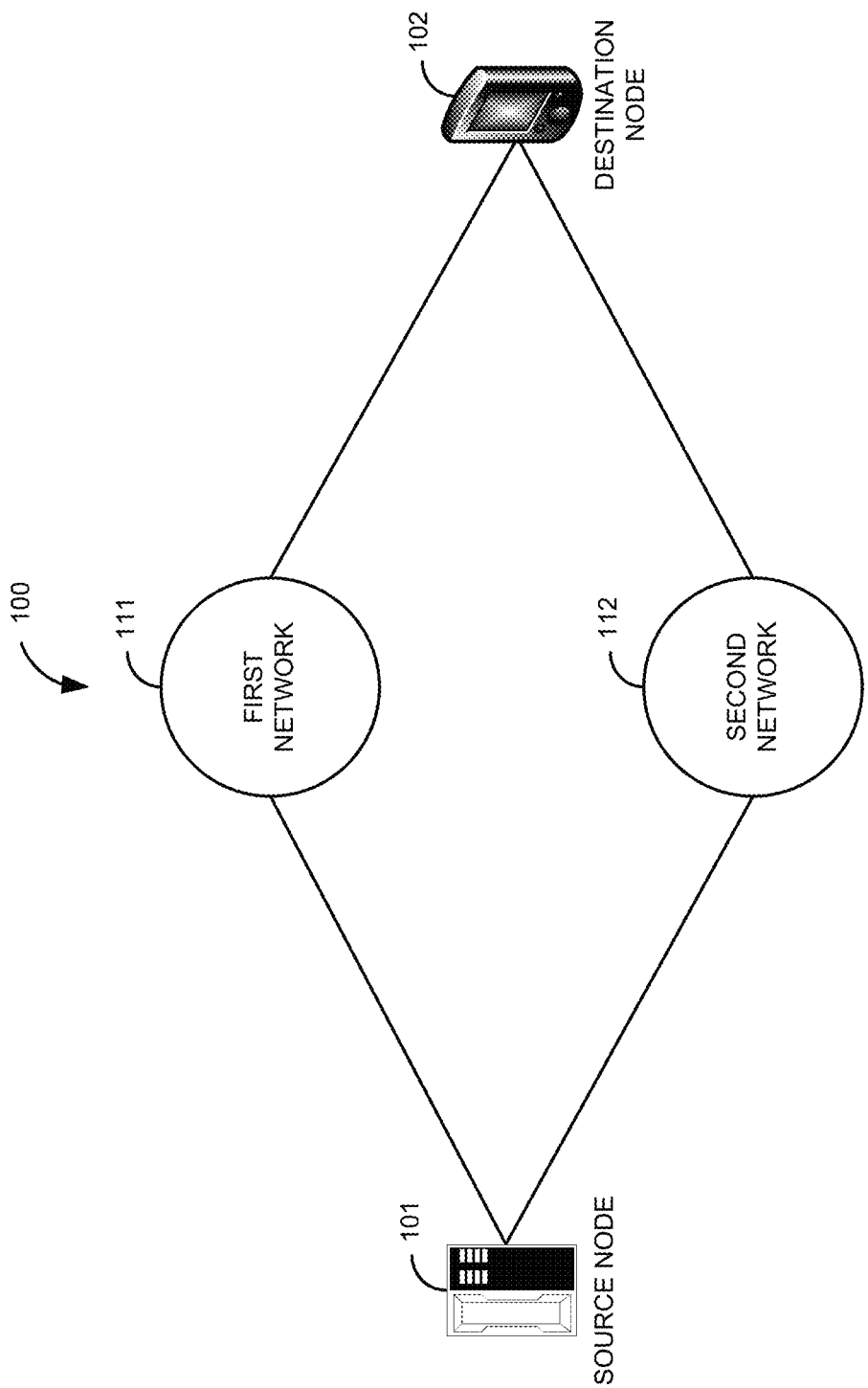
FIG. 1 is a block diagram of a first illustrative system for providing a replacement packet.

FIG. 1 is a block diagram of a first illustrative system 100 for providing a replacement packet. The first illustrative system 100 comprises a source node 101, a destination node 102, a first network 111, and a second network 112. The source node 101 may be any device capable of encoding or forwarding an encoded audio signal such as a telephone, a cellular telephone, a router, a server, a Private Branch Exchange (PBX), and the like. The audio signal can be a sound, an analog rendering of a sound, a packetized audio signal, an encoded audio signal, an audio signal, and the like. The destination node 102 may be any device capable decoding an encoded audio signal such as a telephone, a router, a server, a PBX, a personal computer, a TV, and the like. The encoding/decoding can be any type of encoding such as Pulse Code Modulation (PCM), G.711, G.722, MPEG, JPEG, Tiff, and the like. Other types of encoding include encoding techniques that provide a Mean Opinion Score rating equal to or better than the MOS for ITU-T Recommendation G.711 can be used. The first network 111 and the second network 112 can be any type of network such as the Internet, the Public Switch Telephone Network (PSTN), a wireless network, a wired network, a cellular network, and the like.

The source node 101 generates a first audio stream which represents an audio signal. The source node 101 can generate the first audio stream by encoding the audio signal or can generate the first audio stream by forwarding encoded packets of the audio signal. The first audio stream comprises one or more packets. The one or more packets in the first audio stream may be any type of packets such as Session Initiation Protocol (SIP) packets, H.323 packets, Integrated Digital Services Network (ISDN) packets, encoded audio packets, and the like. Each packet in the first audio stream has a duration and a timestamp. The duration is a period of time of the audio signal that is encoded in the packet. The timestamp is the time that the packet was created in relation to the other packets in an audio stream. The timestamp can be generated in a variety of ways that one skilled in the art would recognize. For example, a packet sequence number could be used for the timestamp.

The source node 101 encodes the represented audio signal into a second audio stream. The source node 101 encodes the represented audio signal using a different encoding method than the one used to encode the first audio stream. The encoding method that is used to encode the second audio stream can use less bandwidth than the encoding method used to encode the first audio stream. For example, the second audio stream could be encoded at a rate of 32 kilobits per second or less while the first audio stream may be encoded at 64 kilobits per second. The second audio stream can be encoded with various methods including, but not limited to Global System for Mobile communications (GSM), Code Division Multiple Access (CDMA), Time Division Multiple Access (TDMA), and IEEE 802.11 protocols. The second audio stream is typically encoded at the same time as the first audio stream. However, in other embodiments, the second audio stream can be encoded either before or after the first audio stream.

The second audio stream comprises one or more packets. The one or more packets in the second audio stream may be any type of packets such as Session Initiation Protocol (SIP) packets, H.323 packets, Integrated Digital Services Network (ISDN) packets, and the like. Each packet in the first audio stream has a corresponding packet in the second audio stream. The corresponding packet in the second audio stream has the same duration and the same timestamp as the corresponding packet in the first audio stream. The corresponding packets from the first audio stream and the second audio stream are encoded from the same information from the represented audio signal.

To illustrate an example of how the system of FIG. 1 would work, consider the following example. If the audio signal was 100 milliseconds (ms) long and the source node 101 sampled at a rate of 20 ms for each packet, the source node would encode five packets for the first audio stream. Assuming a timestamp starting at 0 using 20 ms increments, the first packet generated for the first audio stream would have a timestamp of 0 and a duration of 20 ms. The second packet of the first audio stream would have a timestamp of 20 ms and a duration of 20 ms. The next three packets would be encoded in like manner, each with an incrementing timestamp and the same duration. The first packet of the second audio stream would be encoded (with a second encoding method) using the same portion of the audio stream (i.e. the first 20 ms of the audio stream) as the first packet of the first audio stream. The first packet of the second audio stream would have a corresponding duration (20 ms), and a corresponding timestamp (0) as the first packet in the first audio stream. Likewise, the second packet in the second audio stream would encode the same portion of the represented audio signal (i.e. the second 20 ms of the represented audio signal), have the same duration (20 ms), and have the same timestamp (20 ms) as the second packet of the first audio stream. The third, fourth, and fifth packets of the second audio stream will have corresponding durations and timestamps as the third, fourth, and fifth packets in the first audio stream.

In this example, all the packets in the first and second audio stream have the same duration. The duration of the packets in the first audio stream can vary as long as the duration of the corresponding packets in the second audio stream have the same duration. For example, the first packet in the first and second audio stream could have a duration of 10 ms and the second packet in the first and second audio stream could have a duration of 15 ms.

The source node 101 sends the first audio stream on the first network 111. The source node 101 sends the second audio stream on the second network 112. The destination node 102 receives the first and second audio streams. The destination node 102 detects a missing or delayed packet in the first audio stream. A missing packet could be a packet that was received, but has been corrupted (e.g. a bad cyclic redundancy check or checksum) and is discarded. The destination node 102 can detect a missing or delayed packet in various ways such as timestamps and/or packets numbers, and the like. The destination node 102 regenerates the represented audio signal. The represented audio signal is regenerated using the packets from the first audio stream and the corresponding packet to the missing or delayed packet in the first audio stream from the second audio stream.

Figure 2:
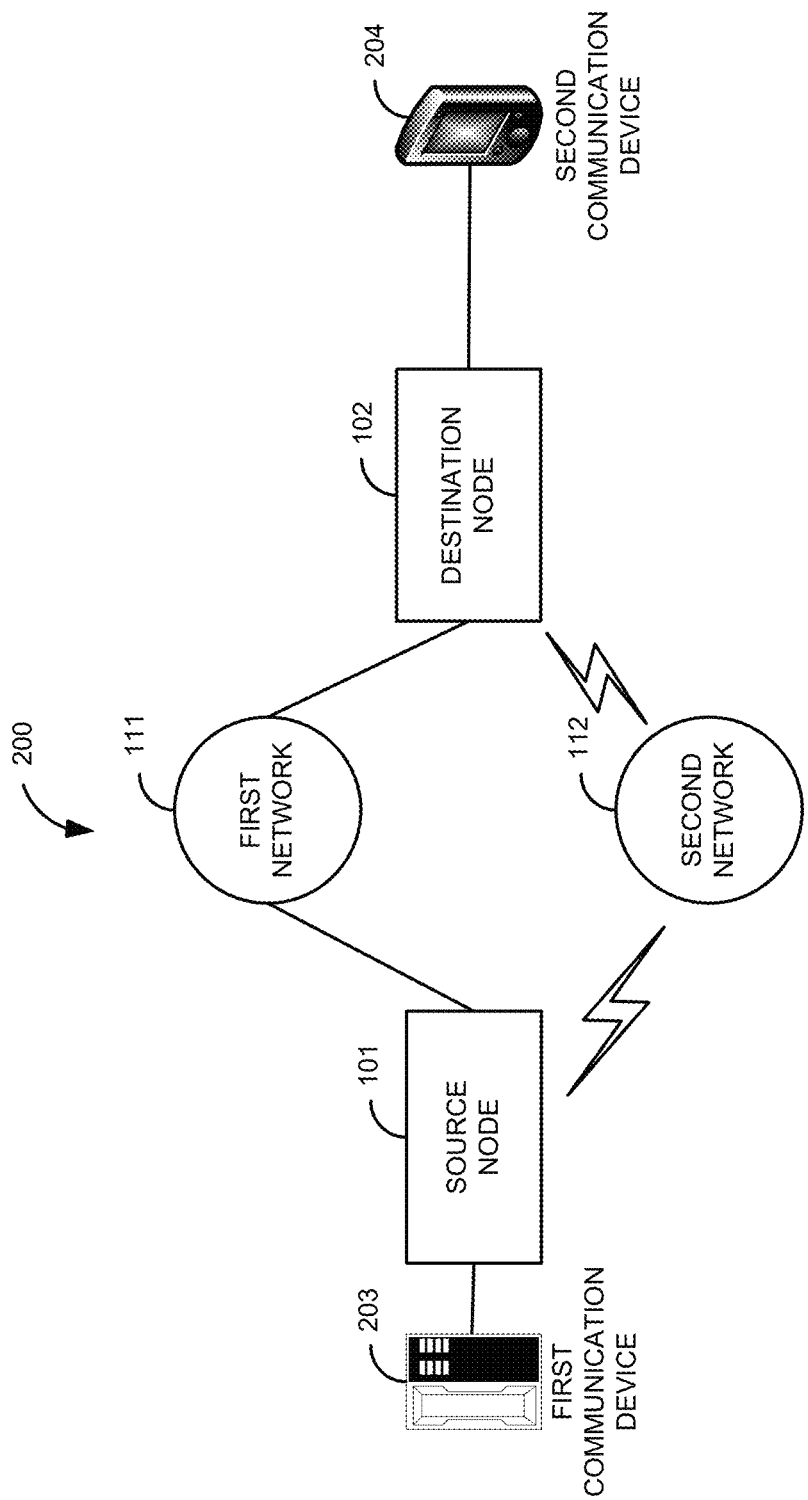
FIG. 2 is a block diagram of a second illustrative system for providing a replacement packet.

FIG. 2 is a block diagram of a second illustrative system for providing a replacement packet. The second illustrative system 200 for providing a replacement packet comprises a first communication device 203, a second communication device 204, a source node 101, a destination node 102, a first network 111, and a second network 112. The first communication device 203 and the second communication device 204 may be any device capable of encoding, forwarding, or sending an audio signal such as a telephone, a cellular telephone, a Personal Digital Assistant (PDA), a PBX, a router, and the like.

The first communication device 203 can encode or forward an encoded audio signal to send to the source node 101. For example, a user could be speaking into the telephone which encodes an audio signal which is packetized and sent to the source node 101. The first communication device 203 can be a network device such as a PBX that forwards Session Initiation Protocol (SIP) packets to the source node 101. The source node 101 receives an encoded audio signal from the first communication device 203.

The source node 101 generates a first audio stream which represents the audio signal. For example, the source node 101 can forward the packets of an encoded audio signal, encode an audio signal into a different encoding format, encode an unencoded audio signal, take a 64 kbs Time Division Multiplexed (TDM) signal, and convert the audio signal into SIP packets, and the like. The first audio stream comprises one or more packets. Each of the packets in the first audio stream has a timestamp and duration.

The source node 101 encodes the audio signal into a second audio stream. The second audio stream is encoded using a different encoding technique than the first audio stream. The second audio stream can use an encoding technique that uses less bandwidth than the first encoding technique. Each packet in the first audio stream has a corresponding packet in the second audio stream. Each corresponding packet in the second audio stream has the same duration and same timestamp as the corresponding packet in the first audio stream.

The source node 101 sends the first audio stream on a first network 111. The source node 101 sends the second audio stream on a second network 112. The destination node 102 receives the first audio stream and the second audio stream. The destination node 102 detects a missing or delayed packet in the first audio stream. The destination node 102 regenerates the audio signal. The audio signal is regenerated using the packets from the first audio stream and the corresponding packet to the missing or delayed packet in the first audio stream from the second audio stream. The regenerated audio signal is sent to the second communication device 204.

Figure 3:
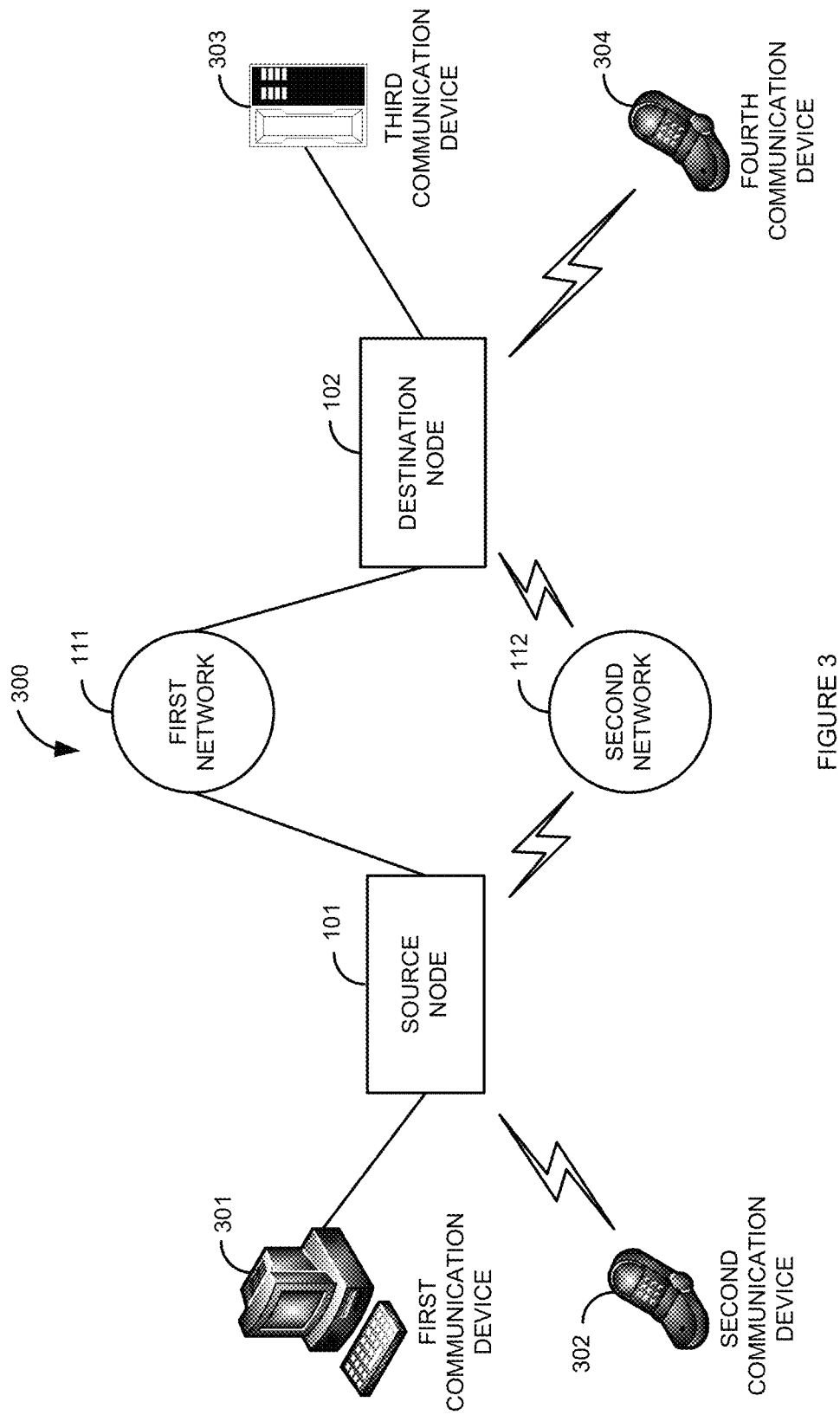
FIG. 3 is a block diagram of a third illustrative system for providing a replacement packet.

FIG. 3 is a block diagram of a third illustrative system 300 for providing a replacement packet. The third illustrative system 300 for providing a replacement packet comprises a first communication device 301, a second communication device 302, a third communication device 303, a fourth communication device 304, a source node 101, a destination node 102, a first network 111, and a second network 112. Communication devices 301-304 may be any device capable of processing an audio signal such as a telephone, a cellular telephone, a Personal Digital Assistant (PDA), a PBX, a router, and the like.

The first communication device 301 can generate or forward a first audio signal to send to the source node 101. Likewise, the second communication device 302 can generate or forward a second audio signal to send to the source node 101. Additional network devices could also send additional audio signals to the source node 101.

The source node 101 receives a first audio signal from the first communication device 301. The source node 101 receives a second audio signal from the second communication device 302. The source node 101 generates a first audio stream which represents the first audio signal. Likewise, the source node 101 generates a second audio stream which represents the second audio signal. Each of the first and second audio streams comprises one or more packets. Each of the one or more packets in the first audio stream and the second audio stream has a timestamp and duration.

The source node 101 encodes at least one threshold point in the first audio signal into at least one threshold packet. A threshold point is a sample of the audio signal that has acoustic importance relative to a threshold level. This could be accomplished using various techniques.

For example, U.S. Pat. No. 7,359,979,, which is incorporated herein by reference, discloses a method for sampling acoustic signals to determine a priority score for samples of the audio signal. In this technique, certain sounds in speech, if lost can cause degradation of the regenerated audio signal audio signal if packets containing those sounds are lost. Whereas other points in the audio signal, if lost have little or no effect in regenerating the audio signal. Points in the audio signal that can cause more degradation if lost receive a higher priority score. Points in the audio signal that don't cause as much degradation if lost receive a lower priority score. Using this technique, a priority score for threshold points of the audio signal, and their importance to regenerating the audio signal is created. Threshold packets are generated based on whether the priority score of the threshold point exceeds the threshold level. A threshold level can be a dynamic level that can be adjusted based various criteria. If a threshold point priority score exceeds the threshold level, a threshold packet is encoded. If the threshold point priority score does not exceed the threshold level, then a threshold packet is not generated for the threshold point. Other methods of determining acoustic importance of threshold points include, but are not limited to, a psycho-acoustic prioritization in which the priority score is based on the audio signal's contribution to intelligibility, a psycho-acoustic prioritization in which the priority score is based on the audio signal's contribution to perceived voice quality, the presence or absence of a within-sample plosive sound, a transition from one type of speech sound to another, and the like. Each of the threshold packet(s) that are encoded from the first audio stream has a corresponding packet in the first audio stream. Each corresponding threshold packet has the same timestamp and duration as the corresponding packet in the first audio stream. Likewise, the source node 101 encodes at least one threshold point in the second audio signal into at least one threshold packet. Each of the threshold packet(s) that are encoded from the second audio signal has a corresponding packet in the second audio stream. Each corresponding threshold packet has the same timestamp and duration as the corresponding packet in the second audio stream. The source node 101 could repeat this process for additional audio signals/streams.

The source node 101 sends the first audio stream on a first network 111. The source node 101 sends the second audio stream on the first network 111. However, the source node 101 can send the first audio stream on the first network 111 and send the second audio stream on a different network than the first network 111. Alternatively, the first and second audio streams can be multiplexed together into a single stream. The source node 101 sends the threshold packet(s) that are encoded from the first audio stream on the second network 112. The source node 101 sends the threshold packet(s) that are encoded from the second audio stream on the second network 112. The encoded threshold packets can be multiplexed over a common link on the second network 112 or can be routed across various nodes within the second network 112.

The threshold packet(s) can be generated using different encoding techniques based on the quality of the first network 111 or the quality of the second network 112. For example, if the quality of the first network 111 is high, then a higher quality encoding method can be used that takes up more bandwidth. The compression method used to encode the threshold packet(s) can also be based on the number of audio streams that are being sent on the first network 111. For example, if there are a large number (e.g. more than two), the encoding techniques may compress the threshold packets so that the threshold packets do not cause too much congestion on the second network 112 or on a common link within the second network 112.

The threshold packet(s) can be generated and sent based on the availability of bandwidth in the second network 112. For example, as more audio streams are sent over the first network 111, the amount of available bandwidth for each stream sending threshold packets that are multiplexed over a common link on the second network 112 is reduced. One technique that can be used is to increase the threshold level so that fewer threshold packets for each audio stream are sent on the common link on the second network 112.

The threshold level can be changed dynamically. The threshold level can be changed dynamically for each audio stream. The threshold level can be changed dynamically based on a quality of service level for the first network 111 and/or the second network 112 in conjunction with each audio stream. For example, as the quality of the first network 111 degenerates, the number of threshold packets for a specific audio stream could be increased by increasing the threshold level for the specific audio stream.

The destination node 102 receives the first audio stream and the second audio stream and any additional audio streams. The destination node 102 detects a missing or delayed packet in the first audio stream. The destination node 102 regenerates the first audio signal using the packets from the first audio stream and the corresponding threshold packet to the missing or delayed packet in the first audio stream. Likewise, the destination node 102 detects a missing or delayed packet in the second audio stream. The destination node 102 regenerates the second audio signal using packets from the second audio stream and the corresponding threshold packet to the missing or delayed packet in the second audio stream.

The third illustrative system 300 can accommodate additional devices sending additional audio signals to the source node 101. The source node 101 can encode/forward packets in like manner across the first network 111 and the second network 112. The destination node 102 can regenerate the additional audio signals in like manner.

Figure 4:
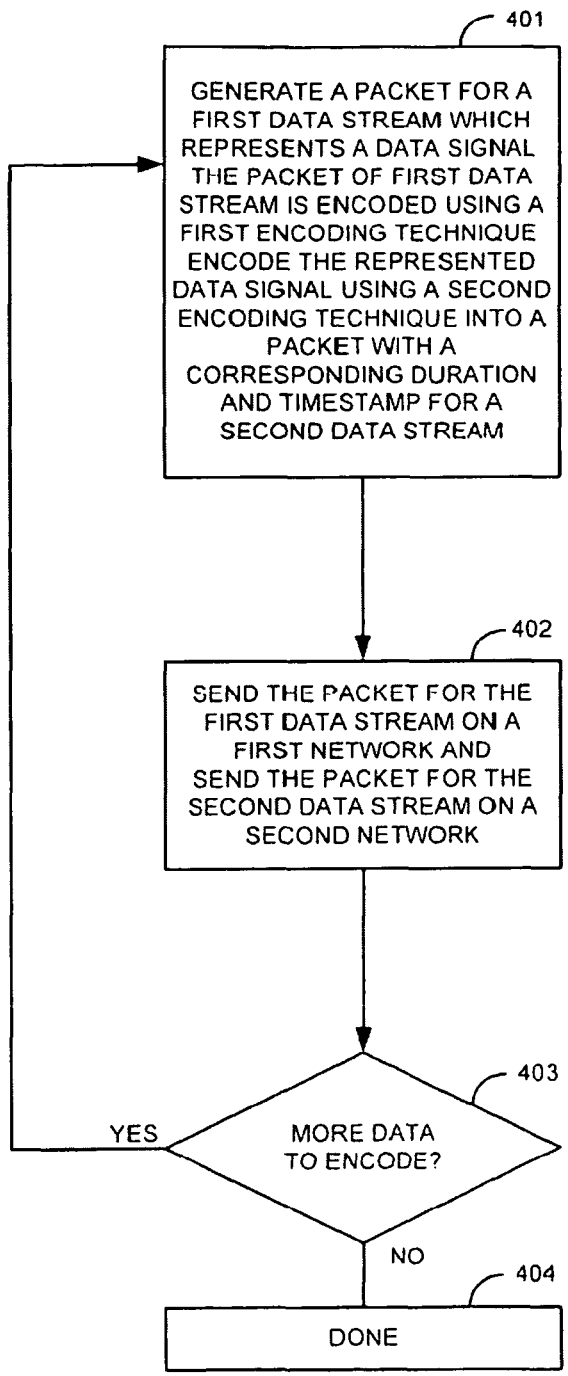
FIG. 4 is a flow diagram of a first illustrative method of generating packets for by providing replacement packets.

FIG. 4 is a flow diagram of a first illustrative method of generating packets by providing a replacement packet. Illustratively, the source node 101, the destination node 102, and the communication devices (203-204 and 301-304) are stored-program-controlled entities, such as a computer, which perform the method of FIGS. 4-7 by executing a program stored in a storage medium, such as a memory or disk.

The process gets generates 401 a packet for a first audio stream which represents an audio signal. The packet for the first audio stream is encoded with a first encoding technique. The packet for the first audio stream has a duration and timestamp. The generating of the packet for the first audio stream in step 401 can be done in a variety of ways, such as, forwarding a packet of an audio signal which is encoded, encoding an audio signal into a different encoding format, encoding an unencoded audio signal, taking a 64 kbs Time Division Multiplexed (TDM) signal and converting the audio signal into SIP packets, and the like. In addition, in step 401, the represented audio signal is encoded using a different encoding technique into a packet for a second audio stream. The packet in the second audio stream has a corresponding packet in the first audio stream. The corresponding packet has the same duration and timestamp.

The packet of the first audio stream is sent 402 on a first network 111 and the corresponding packet for the second audio stream is sent 402 on a second network 112. The process checks 403 to see if there is more of the represented audio signal to encode. If there is more of represented audio signal (s) to encode or packets to forward, the process goes to step 401 to get the additional portion of the audio signal. Otherwise, the process is done 404.

Figure 5:
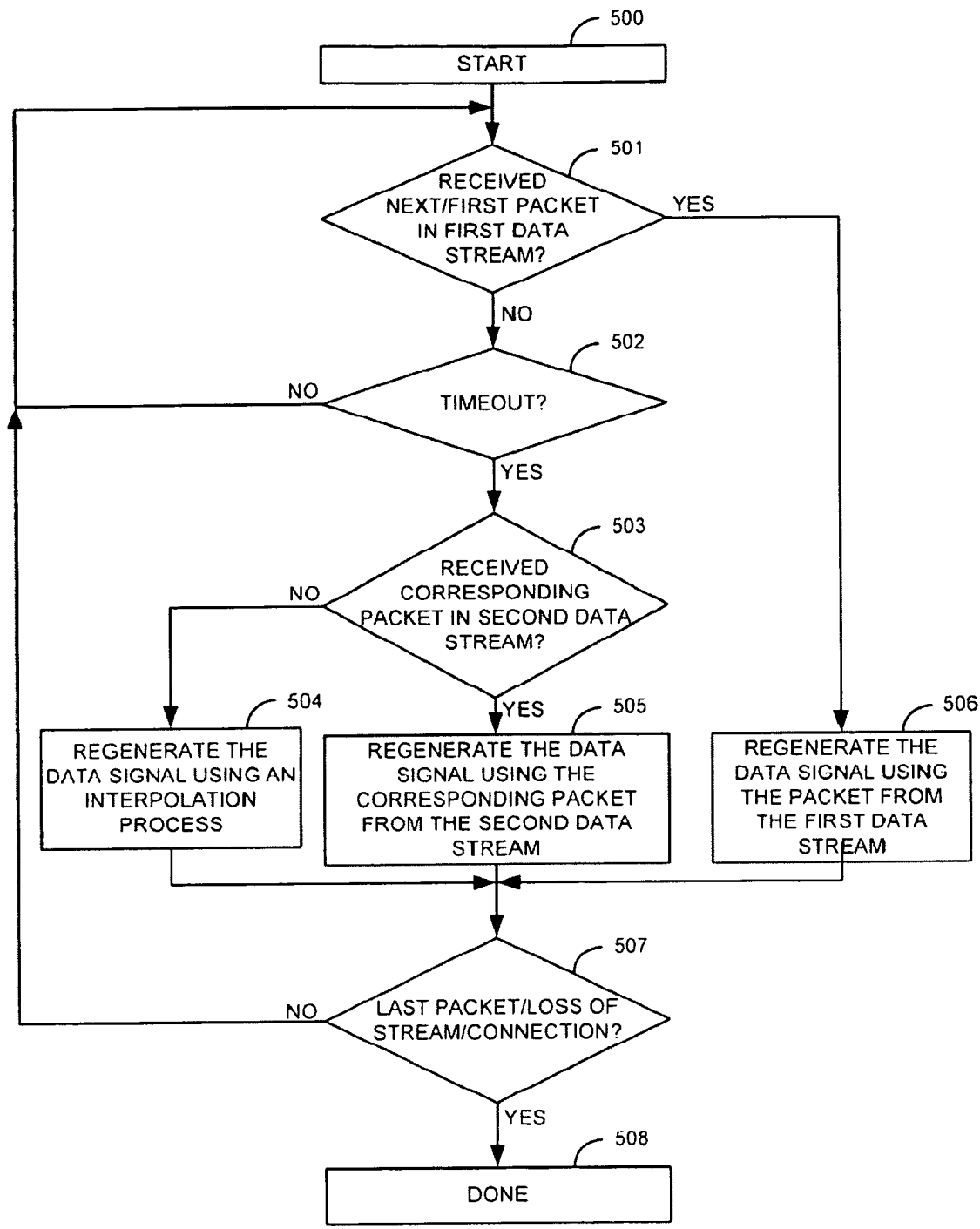
FIG. 5 is a flow diagram of a first illustrative method of receiving packet streams and regenerating an audio signal by providing replacement packets.

FIG. 5 is a flow diagram of a first illustrative method of receiving the first and second audio streams that are sent in FIG. 4 and regenerating an audio signal by providing a replacement packet. The process starts 500. The process checks 501 to see if a next/first packet in a first audio stream has been received within a timeout period. If the next/first packet in the first audio stream is received within the timeout period in step 501, the process regenerates 506 the audio signal using the received packet from the first audio stream and the process goes to step 507. Otherwise, if a next/first packet in the first audio stream has not been received, the process checks 502 to see if there has been a timeout. A timeout can occur when a packet is lost and is never received, when a packet has experienced too much delay and is dropped due to time sensitivity, when a packet has been corrupted, and the like. If there has not been a timeout in step 502, the process goes to step 501. Otherwise, the process determines 503 if the corresponding packet in the second audio stream has been received. If the corresponding packet in the second audio stream has been received in step 503, the represented audio signal is regenerated 505 using the corresponding packet from the second audio stream. If the corresponding packet from the second audio stream has not been received, the audio signal is regenerated 504 using an interpolation process. An interpolation process is a process where the missing audio from a missing packet is filled in using various mechanisms. Examples of interpolation processes include, but are not limited to interpolating between packets, filling white noise, and filling with pink noise. The process determines 507 if the received packet is the last packet in the first and/or second audio stream or if the connection of the first and/or second audio stream has been lost. If the received packet is not the last packet and the connection for the first and/or second audio stream has not been lost in step 507, the process goes to step 501. Otherwise, the process is done 508.

Figure 6:
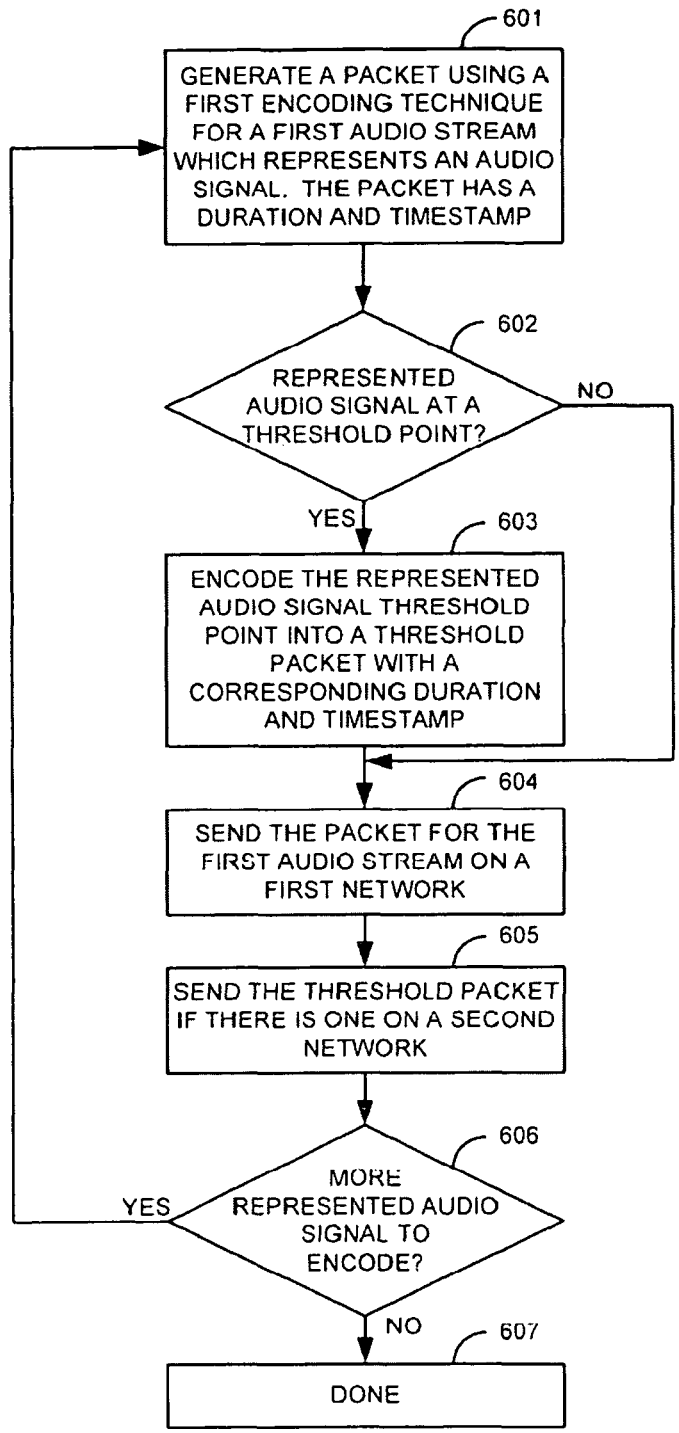
FIG. 6 is a flow diagram of a second illustrative method of generating packets by providing replacement packets.

FIG. 6 is a flow diagram of a second illustrative method of generating packets by providing a replacement packet. The process generates 601 a packet of a first audio stream which represents an audio signal. The packet of first audio stream is encoded using a first encoding technique. The packet has a timestamp and duration. The generation of the packet for the first audio stream in step 601 can be done in a variety of ways, such as, forwarding the packet of the audio signal which is encoded, encoding the audio signal into a different encoding format, encoding an unencoded audio signal, taking a 64 kbs Time Division Multiplexed (TDM) signal and converting the audio signal into SIP packets, and the like.

The process checks 602 if the represented audio signal is at a threshold point. If the represented audio signal is not at a threshold point in step 602, the process goes to step 604. Otherwise, if the represented audio signal is at a threshold point in step 602, the process encodes 603 the represented audio signal threshold point into a threshold packet that has a corresponding packet in the first audio stream. The threshold packet has the same timestamp and duration as the corresponding packet in the first audio stream. The process sends 604 the packet for the first audio stream on the first network 111. The process sends 605 the threshold packet on the second network 112 if the threshold packet was generated in step 603. The process checks 606 to see if there is more of the represented audio signal to encode. If there is more of the represented audio signal to encode in step 606, the process goes to step 601. Otherwise if there is not any more of the represented audio signal to encode in step 606, the process is done 607. The method of FIG. 6 can be repeated to incorporate encoding of additional audio signals.

Figure 7:
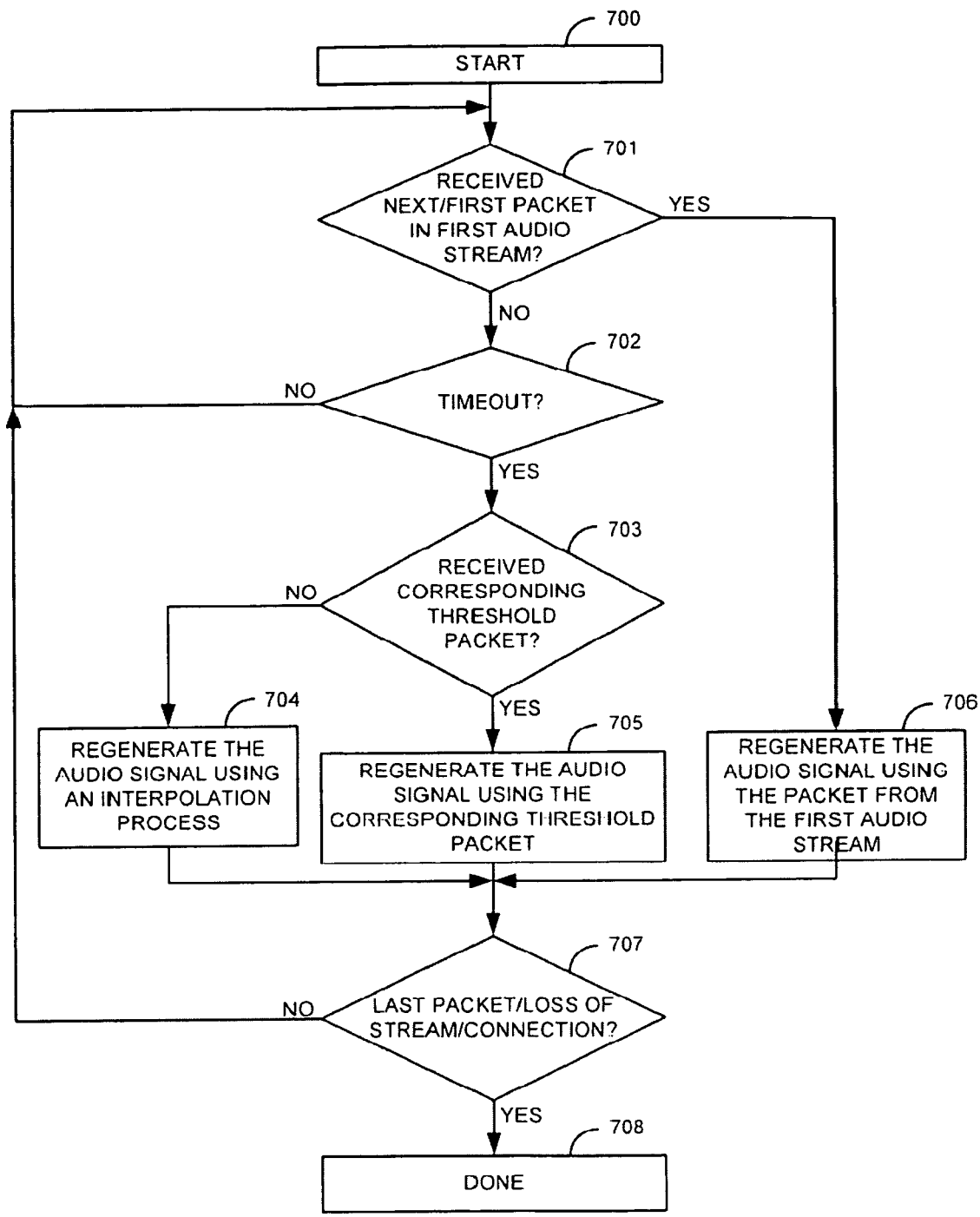
FIG. 7 is a flow diagram of a second illustrative method of receiving audio streams and regenerating an audio signal by providing replacement packets.

FIG. 7 is a flow diagram of a second illustrative method of receiving audio streams and the threshold packets associated with the audio streams that are sent in FIG. 6 and regenerating an audio signal using providing a replacement packet. The process starts at step 700. The process checks 701 to see if a next/first packet in a first audio stream has been received within a timeout period. If the next/first packet in the first audio stream is received within the timeout period in step 701, the process regenerates 706 the audio signal using the received packet from the first audio stream and the process goes to step 707. Otherwise, if a next/first packet in the first audio stream has not been received, the process checks 702 to see if there has been a timeout. If there has not been a timeout in step 702, the process goes to step 701. Otherwise, the process determines 703 if a corresponding threshold packet has been received. If the corresponding threshold packet has been received in step 703, the audio signal is regenerated 705 using the corresponding threshold packet. If the corresponding threshold packet has not been received, the audio signal is regenerated 704 using an interpolation process. The process determines 707 if the received packet is the last packet in the first audio stream or if the connection of the first audio stream has been lost. If the received packet is not the last packet and the connection for the first audio stream has not been lost, the process goes to step 701. Otherwise, the process is done 707.

Figure 8:
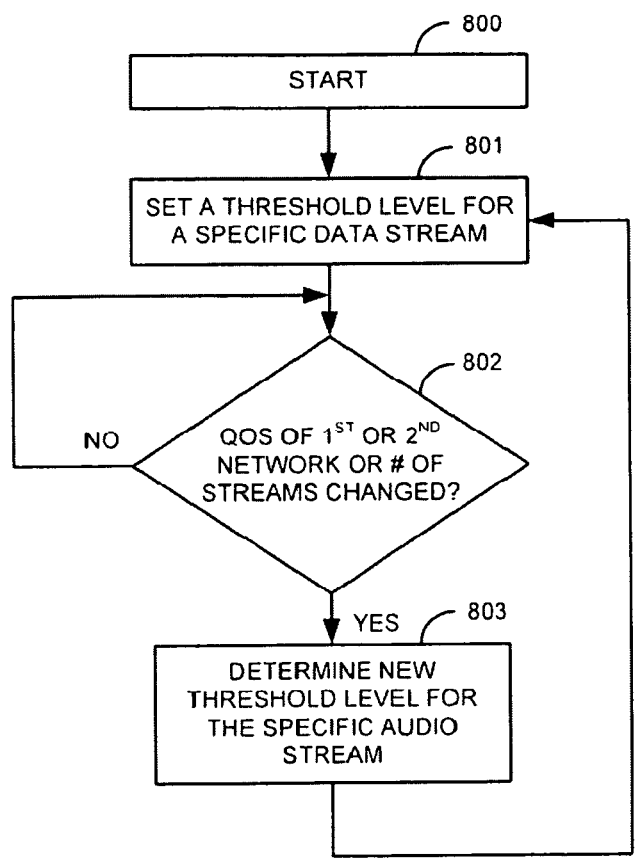
FIG. 8 is a flow diagram of a method of dynamically changing a threshold level for sending threshold packets.

FIG. 8 is a flow diagram of a method of dynamically changing a threshold level for sending threshold packets. The process starts at step 800. A threshold level can be set 801 based on a specific audio stream, a grouping of audio streams, the bandwidth of link for multiplexing the threshold packets, and the like. If the threshold level is set based on the bandwidth of the link, then only threshold points from an audio stream will be encoded into threshold packets and sent if their priority score exceed the threshold level. For example, if the link only allowed one hundred packets per second and there were multiple audio signals, then only one hundred threshold packets that have the highest priority score would be encoded. This could mean than one audio stream can have more threshold packets encoded and sent than another audio stream.

Moreover, the threshold level can be set 801 based on the Quality of Service (QOS) of the first network 111, the second network 112, the number of streams being multiplexed on a common link, and/or the like. The process checks 802 to see if the QOS of the first network 111, the QOS second network, and/or the number of streams being multiplexed on the link in the second network has changed. If the QOS of the first network 111, the QOS of the second network 112, and/or the number of streams being multiplexed on the second network has not changed, the process at step 802 is repeated. Otherwise, the process determines 803 a new threshold level for the specific audio stream, for a grouping of audio streams, or for the bandwidth of the link.

For example, if the process determines 802 a change (e.g. congestion) in the first network 111 and the number of dropped packets has increased (i.e. a change in the QOS); the threshold level can be decreased to send more threshold packets on the second network 112 for the specific data stream. Later as the congestion in the first network 111 decreases, the process determines 802 a change in the congestion of the first network 111 and determine 803 a higher threshold level and sends more threshold packets on the second network 112 from the specific data stream.

Of course, various changes and modifications to the illustrative embodiment described above will be apparent to those skilled in the art. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for providing a replacement packet comprising:

a. source node configured to generate a first audio stream representing an audio signal, wherein the first audio stream is encoded via a first encoding technique, wherein the first audio stream comprises one or more packets, each with a duration and a timestamp, to encode the represented audio signal into a second audio stream via a second encoding technique that is different from the first encoding technique and that uses less bandwidth than the first encoding technique, wherein the source node is a common source for both the first and second audio streams, wherein for each packet in the first audio stream there is a corresponding packet in the second audio stream, wherein each packet in the second audio stream has the same duration and the same timestamp as the corresponding packet in the first audio stream, to send the first audio stream on a first network, and to send the second audio stream on a second network, wherein the second network comprises a link established over the second network to transmit the second audio stream that provides a lower bandwidth than a link established over the first network to transmit the first audio stream; and b. a destination node configured to receive the first and second audio streams, to detect a missing or delayed packet in the first audio stream, and to regenerate the represented audio signal using the one or more packets from the first audio stream and a packet corresponding to the missing or delayed packet in the first audio stream from the second audio stream.

2. The system of claim 1, wherein generating the first audio stream representing the audio signal is accomplished by a technique selected from the group comprising: encoding the audio signal or forwarding encoded packets of the audio signal.

3. The system of claim 1, wherein the destination node is further configured to detect that the corresponding packet to the missing or delayed packet in the first audio stream was not received and improve a perceived quality of the regenerated audio signal by replacing audio from the missing or delayed packet in the first audio stream using an interpolation process selected from the group comprising: interpolating between packets, filling with white noise, and filling with pink noise.

4. The system of claim 1, wherein the one or more packets in the first audio stream comprise a plurality of packets, wherein the duration of at least two packets of the plurality of packets in the first audio stream is different, wherein the one or more packets in the second audio stream comprise a plurality of packets, and wherein the duration of at least two packets of the plurality of packets in the second audio stream is different.

5. The system of claim 1, wherein the one or more packets in the first audio stream or the second audio stream contain at least one packet type selected from the group comprising: a SIP packet, a H.323 packet, and an ISDN packet.

6. The system of claim 1, wherein the one or more corresponding packets in the second audio stream are encoded using a technique that requires an audio rate less than or equal to 32 kilobits per second.

7. The system of claim 1, wherein the first audio stream is encoded with a technique that provides a Mean Opinion Score (MOS) rating equal to or better than the MOS for ITU-T Recommendation G.711.

8. The system of claim 1, wherein the first network is a wired network and the second network is a wireless network.

9. The system of claim 8, wherein the corresponding packets in the second audio stream are packetized using at least one protocol selected from the group comprising: GSM, CDMA, TDMA, and IEEE 802.11 protocols.

10. The system of claim 1, wherein
the source node is configured to encode at least one threshold point in the represented audio signal into at least one corresponding threshold packet that has a duration and a timestamp, wherein the corresponding packet in the first audio stream has the same duration and the same timestamp as the at least one threshold packet.

11. The system of claim 10, wherein the destination node is further configured to detect a missing or delayed packet in the first audio stream that does not correspond to the at least one threshold packet, and improve a perceived quality of the regenerated audio signal by replacing audio in the missing or delayed packet using an interpolation process selected from the group comprising: interpolating between packets, filling with white noise, and filling with pink noise.

12. The system of claim 10, wherein the at least one threshold point is encoded based on at least one technique selected from the group comprising: a psycho-acoustic prioritization in which a priority score is based on the audio signal's contribution to intelligibility, a psychoacoustic prioritization in which the priority score is based on the audio signal's contribution to perceived a voice quality, presence or absence of a within-sample plosive sound, and a transition from one type of speech sound to another.

13. The system of claim 10, wherein the source node is further configured to set a threshold level for the at least one threshold packet based on at least one item selected from the group comprising: a change in a quality of service of the first network, a change in a quality of service for the second network, a bandwidth of a link on the second network, a grouping of audio streams, and a change in the a number of audio streams being sent by the source node.

14. The system of claim 10, wherein
the source node is configured to encode a threshold point of one or more threshold points in each of a plurality of represented audio signals into a separate corresponding threshold packet each with a duration and a timestamp, wherein for each threshold packet there is a corresponding packet in the corresponding first and second audio streams, and wherein each threshold packet has the same duration and the same timestamp as the corresponding packet in the corresponding first and second audio streams.

15. The system of claim 14, wherein the threshold packets are multiplexed over a common link within the second network.

16. The system of claim 14, wherein encoding of the threshold packets are based on a quality of the first network or a quality of the second network.

17. The system of claim 14, wherein encoding of the threshold packets is based on a number of the audio streams.

18. The system of claim 14, wherein the thresholds packets are multiplexed over a common link within the second network.

19. The system of claim 14, wherein encoding of the threshold packets is based on a quality of the first network or a quality of the second network.

20. The system of claim 14, wherein encoding of the threshold packets is based on the number of separate audio streams.

21. The system of claim 14, wherein the plurality of separate audio streams are multiplexed into a single audio stream.

22. The system of claim 14, wherein the source node is further configured to set a threshold level for the corresponding threshold packets based on at least one item selected from the group comprising: a change in a quality of service of the first network, a change in a quality of service for the second network, a bandwidth of a link on the second network, a grouping of audio streams, and a change in the a number of audio streams being sent by the source node.

23. A method for providing a replacement packet comprising:
a. generating, by a common source node, a first audio stream representing an audio signal, wherein the first audio stream is encoded using a first encoding technique, and wherein the first audio stream comprises one or more packets, each with a duration and a timestamp;
b. generating, by the common source node, a second audio stream representing an audio signal, wherein the second audio stream is encoded using a second encoding technique, and wherein the second audio stream comprises one or more packets, each with a duration and a timestamp, the second encoding technique using less bandwidth than the first encoding technique, the second audio stream having a corresponding packet for each packet in the first audio stream that has the same duration and the same timestamp as the corresponding packet in the first audio stream, wherein the second network comprises a link established over the second network that provides a lower bandwidth to transmit the second audio stream when compared to a link established over the first network to transmit the first audio stream;
c. sending, by the common source node, the first audio stream on the first network;
d. sending, by the common source node, the second audio stream on the second network;
e. receiving, by a common destination node, the first and second audio streams;
f. detecting, by the common destination node, a missing or delayed packet in the first audio stream; and
g. regenerating, by the common destination node, the represented audio signal using the one or more packets from the first audio stream and the corresponding packet to the missing or delayed packet from the second audio stream.

24. The method of claim 23, wherein generating the first data stream representing the data signal is accomplished by at least one technique selected from the group comprising: encoding the data signal or forwarding encoded packets of the data signal.

25. The method of claim 23, wherein the step of regenerating the data signal further comprises the steps of:
h. detecting that the packet in the second data stream corresponding to the missing or delayed packet was not received; and
i. improving a quality of the regenerated data signal by replacing data from the missing or delayed packet in the first data stream using an interpolation process selected from the group comprising: interpolating between packets, filling with white noise, and filling with pink noise.

26. The method of claim 23, wherein the one or more packets in the first data stream comprise a plurality of packets, and wherein the duration of at least two packets of the plurality of packets is different.

27. The method of claim 23, wherein the one or more packets in the first data stream or the second data stream contain at least one packet type selected from the group comprising: a SIP packet, a H.323 packet, and an ISDN packet.

28. The method of claim 23, wherein the one or more corresponding packets in the second data stream are encoded using a technique that requires a data rate less than or equal to 32 kilobits per second.

29. The method of claim 23, wherein the first data stream is encoded with a technique that provides a Mean Opinion Score rating equal to or better than the MOS for ITU-T Recommendation G.711.

30. The method of claim 23, wherein the first network is a wired network and the second network is a wireless network.

31. The method of claim 30, wherein the one or more packets in the second data stream are packetized using at least one protocol selected from the group comprising: GSM, CDMA, TDMA, and IEEE 802.11 protocols.

32. The method of claim 23, wherein the common source node
encodes at least one threshold point in the represented audio signal, each into a corresponding threshold packet that has a duration and a timestamp, wherein for each threshold packet there is a corresponding packet in the first audio stream that has the same duration and the same timestamp as the corresponding threshold packet.

33. The method of claim 32, wherein generating the first audio stream representing the audio signal is accomplished by a technique selected from the group comprising: encoding the audio signal or forwarding encoded packets of the audio signal.

34. The method of claim 32, further comprising the steps of:
h. detecting a missing or delayed packet in the first audio stream that does not correspond to a threshold packet; and
i. improving a quality of the regenerated audio signal by replacing audio in the missing or delayed packet using an interpolation process selected from the group comprising: interpolating between packets, filling with white noise, and filling with pink noise.

35. The method of claim 32, wherein the one or more packets in the first audio stream comprise a plurality of packets, and wherein the duration of at least two packets of the plurality of packets is different.

36. The method of claim 32, wherein the at least one threshold point is encoded based on at least one technique selected from the group comprising: a psycho-acoustic prioritization in which a priority score is based on the audio signal's contribution to intelligibility, a psychoacoustic prioritization in which the priority score is based on the audio signal's contribution to a perceived voice quality, the presence or absence of a within-sample plosive sound, and a transition from one type of speech sound to another.

37. The method of claim 32, further comprising the step of setting a threshold level for the at least one threshold packet based on at least one item selected from the group comprising: a change in a quality of service of the first network, a change in a quality of service for the second network, a bandwidth of a link on the second network, a grouping of audio streams, and a change in the a number of audio streams being sent by the source node.

38. The method of claim 23, wherein the common source node
encodes at least one threshold point in each of a plurality of audio signals into a threshold packet for each threshold point, each with a duration and a timestamp, wherein for each threshold packet there is a corresponding packet in corresponding first and second audio streams, and wherein each corresponding packet in each corresponding audio stream has the same duration and the same timestamp as each corresponding threshold packet.

39. The method of claim 38, wherein generating the first audio stream representing the audio signal is accomplished by a technique selected from the group comprising: encoding the audio signal or forwarding encoded packets of the audio signal.

40. The method of claim 38, wherein each of the corresponding thresholds packets are multiplexed over a common link within the second network.

41. The method of claim 38, wherein encoding each of the threshold packets is based on a quality of the first network or a quality of the second network.

42. The method of claim 38, wherein encoding each of the threshold packets is based on the number of separate audio streams.

43. The method of claim 38, wherein the plurality of separate audio streams are multiplexed into a single audio stream.

44. The method of claim 38, further comprising the step of setting a threshold level for the corresponding threshold packets based on at least one item selected from the group comprising: a change in a quality of service of the first network, a change in a quality of service for the second network, a bandwidth of a link on the second network, a grouping of audio streams, and a change in the a number of audio streams being sent by the source node.

45. A system for providing a replacement packet comprising:
a. a source node configured to generate a first data stream representing a data signal, wherein the first data stream is encoded via a first encoding technique, wherein the first data stream comprises one or more packets, each with a duration and a timestamp, to encode the represented data signal into a second data stream via a second encoding technique that is different from the first encoding technique and that uses less bandwidth than the first encoding technique, wherein for each packet in the first data stream there is a corresponding packet in the second data stream, wherein each corresponding packet in the second data stream has the same duration and the same timestamp as the corresponding packet in the first data stream, to send the first data stream on a first network, and to send the second data stream on a second network, wherein the second network comprises a link established over the second network that provides a lower bandwidth than a link established over the first network.

46. A system for providing a replacement packet comprising:
a. a destination node configured to receive an encoded first data stream which represents a data signal, wherein the first data stream comprises one or more packets, each with a duration and a timestamp, to receive a second data stream, wherein the second data stream is encoded from the represented data signal using a different encoding technique than the first data stream, wherein the different encoding technique uses less bandwidth than the first encoding technique, wherein for each packet in the first data stream there is a corresponding packet in the second data stream, wherein each packet in the second data stream has the same duration and timestamp as the corresponding packet in the first data stream, and wherein the second data stream was sent over a second different network, the second different network comprises a link established over the second different network that provides a lower bandwidth than a link established over the first network, to detect a missing or delayed packet in the first data stream, and to regenerate the represented data signal using the one or more packets from the first data stream and a packet corresponding to the missing or delayed packet in the first data stream from the second data stream.

47. The system of claim 46, further comprising
a source node configured to generate the first data stream representing the data signal, wherein the first data stream is encoded via the first encoding technique, and -encode at least one threshold point in the represented data signal into at least one corresponding threshold packet that has a duration and a timestamp, wherein the corresponding packet in the first audio stream has the same duration and the same timestamp as the at least one threshold packet.

48. The system of claim 46, wherein the
first data stream represents an audio stream, wherein at least one threshold packet is generated from the represented audio stream, and wherein the at least one threshold packet has a corresponding packet in the first audio stream and has the same duration and timestamp of the corresponding packet in the first audio stream.

49. A tangible and non-transient computer readable medium comprising microprocessor executable instructions that, when executed, perform steps comprising:
generating, by a common source node, a first audio stream representing an audio signal, wherein the first audio stream is encoded using a first encoding technique, and wherein the first audio stream comprises one or more packets, each with a duration and a timestamp;
generating, by the common source node, a second audio stream representing an audio signal, wherein the second audio stream is encoded using a second encoding technique, and wherein the second audio stream comprises one or more packets, each with a duration and a timestamp, the second encoding technique using less bandwidth than the first encoding technique, the second audio stream having a corresponding packet for each packet in the first audio stream that has the same duration and the same timestamp as the corresponding packet in the first audio stream, wherein the second network comprises a link established over the second network that provides a lower bandwidth to transmit the second audio stream when compared to a link established over the first network to transmit the first audio stream;
sending, by the common source node, the first audio stream on the first network; and
sending, by the common source node, the second audio stream on the second network.

50. The computer readable medium of claim 49, wherein a common destination node receives the first and second audio streams; detects a missing or delayed packet in the first audio stream; and regenerates the represented audio signal using the one or more packets from the first audio stream and the corresponding packet to the missing or delayed packet from the second audio stream.

51. The computer readable medium of claim 49, wherein the destination node is further configured to detect that the corresponding packet to the missing or delayed packet in the first audio stream was not received and improve a perceived quality of the regenerated audio signal by replacing audio from the missing or delayed packet in the first audio stream using an interpolation process selected from the group comprising: interpolating between packets, filling with white noise, and filling with pink noise.

52. The computer readable medium of claim 49, wherein the one or more packets in the first audio stream comprise a plurality of packets, wherein the duration of at least two packets of the plurality of packets in the first audio stream is different, wherein the one or more packets in the second audio stream comprise a plurality of packets, and wherein the duration of at least two packets of the plurality of packets in the second audio stream is different.

53. A method comprising:
generating, by a common source node, a first audio stream representing an audio signal, wherein the first audio stream is encoded using a first encoding technique, and wherein the first audio stream comprises one or more packets, each with a duration and a timestamp;
generating, by the common source node, a second audio stream representing an audio signal, wherein the second audio stream is encoded using a second encoding technique, and wherein the second audio stream comprises one or more packets, each with a duration and a timestamp, the second encoding technique using less bandwidth than the first encoding technique, the second audio stream having a corresponding packet for each packet in the first audio stream that has the same duration and the same timestamp as the corresponding packet in the first audio stream, wherein the second network comprises a link established over the second network that provides a lower bandwidth to transmit the second audio stream when compared to a link established over the first network to transmit the first audio stream;
sending, by the common source node, the first audio stream on the first network; and
sending, by the common source node, the second audio stream on the second network.

54. The method of claim 53, wherein a common destination node receives the first and second audio streams; detects a missing or delayed packet in the first audio stream; and regenerates the represented audio signal using the one or more packets from the first audio stream and the corresponding packet to the missing or delayed packet from the second audio stream.

55. The method of claim 53, wherein the destination node is further configured to detect that the corresponding packet to the missing or delayed packet in the first audio stream was not received and improve a perceived quality of the regenerated audio signal by replacing audio from the missing or delayed packet in the first audio stream using an interpolation process selected from the group comprising: interpolating between packets, filling with white noise, and filling with pink noise.

56. The method of claim 53, wherein the one or more packets in the first audio stream comprise a plurality of packets, wherein the duration of at least two packets of the plurality of packets in the first audio stream is different, wherein the one or more packets in the second audio stream comprise a plurality of packets, and wherein the duration of at least two packets of the plurality of packets in the second audio stream is different.

* * * * *